United States Patent Office 3,280,510
Patented Oct. 25, 1966

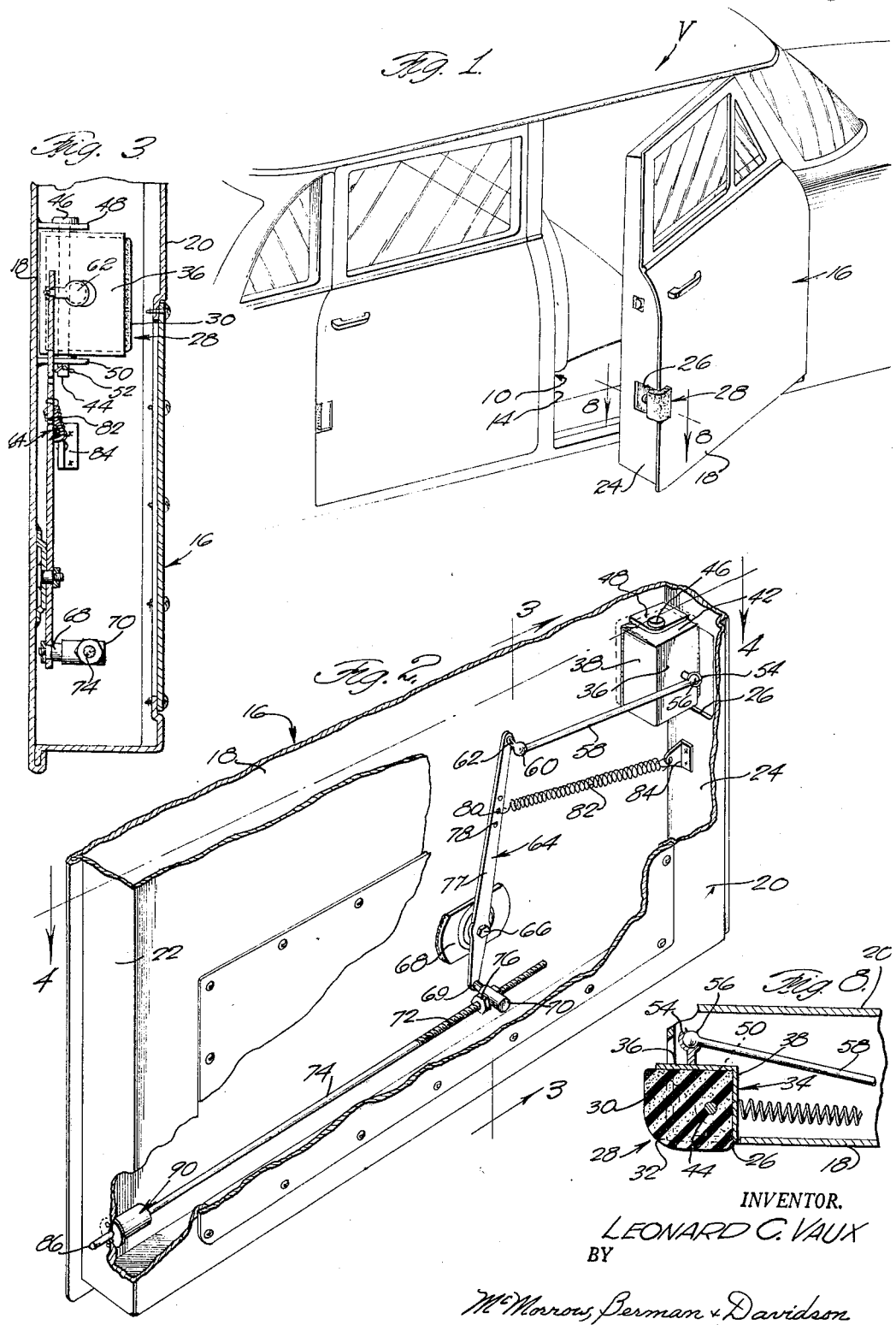

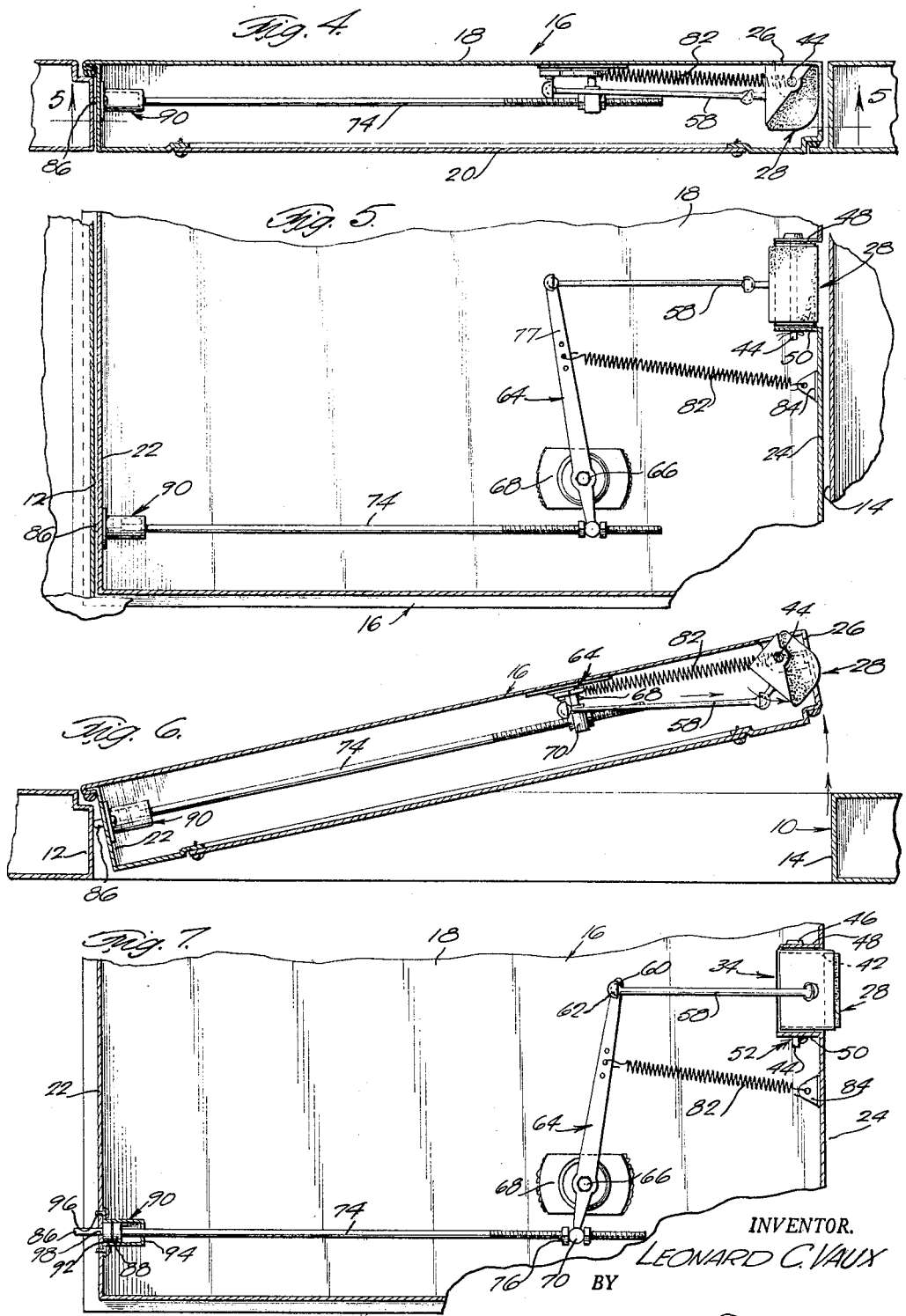

3,280,510
RETRACTABLE DOOR BUMPER
Leonard C. Vaux, 704 3rd Ave. SE., Rochester, Minn.
Filed July 21, 1964, Ser. No. 384,100
2 Claims. (Cl. 49—401)

This invention relates to a retractable bumper especially, but not exclusively, for vehicle doors.

The primary object of the invention is the provision of a simpler, more practical, and more efficient device of the kind indicated, which, on a door being swung to open position, interposes a compressible, mar-proof bumper between the door and any adjacent object, such as another vehicle, thereby offering automatic protection against damage, both to the door and to such vehicle; and, which, on closing of the door retracts into the door.

Another object of the invention is the provision of a device of the character indicated above, which can readily be adapted for factory installation, before delivery of a vehicle; and for sale as an accessory adapted to be marketed for subsequent installation.

In the drawings:

FIGURE 1 is a schematic perspective view showing a device of the invention installed on a vehicle door, the latter being in open position and the bumper being extended to operative position;

FIGURE 2 is an enlarged fragmentary inside perspective view of the vehicle door of FIGURE 1, partly broken away and in section, but showing the bumper in retracted position;

FIGURE 3 is a vertical transverse section taken on the line 3—3 of FIGURE 2;

FIGURE 4 is a horizontal section taken on the line 4—4 of FIGURE 3, showing the door in closed position;

FIGURE 5 is a fragmentary vertical longitudinal section, taken on the line 5—5 of FIGURE 4, showing the mechanism and the bumper in retracted position;

FIGURE 6 is a view, like FIGURE 4, showing the door in partially opened position, and the mechanism and the bumper in partially extended positions;

FIGURE 7 is a view like FIGURE 5, showing the mechanism and the bumper in extended positions; and, FIGURE 8 is an enlarged fragmentary horizontal section taken on the line 8—8 of FIGURE 1.

Referring in detail to the drawings, V generally designates a vehicle whose body is formed with a door opening 10 which defines first and second or front and rear vertical sides 12 and 14, respectively, within which a hollow door 16 is positioned. The door 16 is hinged, in suitable manner (not shown) to the front or first or front side 12 of the door opening. The foregoing is conventional construction.

The door 16 is modified, in any suitable manner, only to the extent of forming, in its rear wall 24, and its outer panel 18, with a rectangular opening 26, at a substantial height above the bottom of the door, through which opening an extensible and retractable bumper 28 works.

As shown in FIGURE 8, and other figures of the drawings, the bumper 28 comprises a generally rectangular and vertically elongated block or cushion 30, of compressible and resilient material, such as rubber. The laterally outward and rearward corner of the block 30 is rounded, as indicated at 32, for more harmless contact with objects, such as an adjacent vehicle, when the door 16 is opened.

The bumper block 30 is structurally reinforced by and carried by a housing 34, having vertical wings 36 and 38, to whose inner surfaces the front and the laterally inward sides of the block are suitably secured; and upper and lower triangular plates 40 and 42, respectively, which engage related ends of the block and extend between and are fixed to the wings 36 and 38.

The upper and lower plates 40 and 42, respectively, of the housing 34 and the block 30 are traversed, on an axis forwardly from the vertical centerline thereof, by a vertical pivot 44, having a head 46, on its upper end.

The pivot 44 extends downwardly through the forward and laterally inward corners of similar upper and lower mounting flanges 48 and 50, respectively, which are suitably fixed to rear door wall 24 and the outer door panel 18, at locations immediately above and below the opening 26. The pivot head 46 bears upon the upper bracket, and a cotter pin 52 extends through the pivot pin and bears against the underside of the lower bracket. The arrangement is such that, as shown in FIGURE 4, in the retracted position of the bumper 28, the latter is wholly enclosed within the door 26; and, in its extended position, as shown in FIGURES 1 and 8, the rounded corner 32 of the block 30 extends rearwardly from the door 26 and laterally outwardly therefrom for harmless and shock-absorbing contact with an adjacent object.

On what, in the retracted position of the bumper 28, is the rear wing 36 of the bumper housing 34, a centered lateral ball socket 54 is fixed, in which is securably engaged a ball 56 on the adjacent of rear end of a forwardly extending horizontal relatively short rear rod or link 58.

The rear rod 58 has on its forward end, a ball 60 which is engaged in a ball socket 62 projecting laterally inwardly from the upper end of a vertical lever 64. The lever 64 is pivoted, as indicated at 66, on a reinforcing plate 68 which is suitably fixed to the inner surface of the outer door panel 18, at a point just rearwardly of the midwidth point of the door 16 and spaced upwardly from the bottom of the door. The axis of the pivot 66 is nearer to the lower end of the lever 64 than to its upper end.

Fixed on the lower end of the lever 64 is a laterally inwardly extending pivot 68, carrying a rotatable member 70, though which is threaded, as indicated at 72, the rear end of a relatively long horizontal front rod or link 74, having thereon an adjustment locking nut 76, engaged with the member 70.

The upper arm 76 of the lever 64 is formed with longitudinally spaced adjustment holes 78, adapted to selectively receive a hook 80, on the forward end of a horizontal bumper extending coil spring 82, which is tethered, at its rear end, to a bracket 84 fixed to the rear door wall 24. In the retracted position of the bumper 28, the spring 82 is substantially stretched, as shown in FIGURE 7. In the extended position of the bumper 28, the spring 82 is available to act as a shock absorber whenever the contact of the bumper with an object is violent enough to cause the bumper to be forced in the direction of retraction thereof.

The forward or front rod or link 74 has fixed thereon, adjacent to its rear end 86, a piston 88 which works in a dash-pot 90, having an open forward end 92 and a closed rear end 94. The forward end 92 of the dash-pot 90 abuts the inner surface of the front door wall 22 and is fixed thereto, as indicated at 96, in line with a hole 98 formed through the wall 22, in which the rear end of the rod 74 works, for operative engagement with the front side 12 of the vehicle door opening 10. The rod 74 is normally biased into engagement with the side 12 by the spring 82, as shown in FIGURES 4 to 6.

In operation, on closing of the door 16, the rear end 96 of the longer forward rod or link 74 has forcible bearing against the front door side 12, and as the front wall 22 of the door approaches the side 12, the front rod 74 is pushed rearwardly, the lever 64 is tilted forwardly, and the rear rod 58 is pivoted inwardly and forwardly, through the opening 26, into the door 16; and the spring 82 is stretched, as indicated in FIGURE 5.

As the door 16 is opened, the front rod 74 is permitted to travel forwardly, under the pressure of the spring 82, until its piston 88 strikes the front door side 12, whereat the bumper 28 is stopped in its extended position, as shown in FIGURES 1, 2 and 8, wherein the bumper extends laterally outwardly and rearwardly relative to the door 16, in a position to harmlessly contact an object with which the bumper rod block 30 may engage. Should such a contact be forcible both the block 30 and the spring 82 serve to absorb the shock, as the bumper block is compressed and is pivoted by the force of the contact, toward its retracted position.

What is claimed is:

1. In a combination, a structure formed with a door opening having a vertical side, a door positioned in said opening, said door having first and second vertical side members, said first door side member being hinged on the structure adjacent to said side of the door opening, said door being hollow and having outer and inner panels connected to said first and second side members, said outer panel and said second side members being formed with a horizontal opening, a bumper comprising an open-sided housing eccentrically pivoted on the door between the panels to pivot on a vertical axis, a compressible and resilient body secured in and reaching out of the housing, said bumper being adapted to occupy a retracted position within the door in the closed position of the door and to occupy an extended position while the door is in open position wherein the block extends laterally outwardly of the door through said opening, and operating means mounted within the door and connected to the bumper housing for retracting and extending the bumper, said operating means comprising a first horizontal rod having one end working through said first door side member for operative contact with the side of the door opening, a lever pivoted intermediate its ends on one of the door panels and connected at its lower end to said first rod, a second horizontal rod connected at one end to the upper end of the lever and at its other end to the bumper housing, and a spring connected to and stretched between the upper part of the lever and the second side member of the door, a dash-pot fixed to said first door side member within the door, said dash-pot being traversed by said first rod, said first rod having a piston fixed thereon and working in said dash-pot.

2. In combination, a structure formed with a door opening having a vertical side, a door positioned in said opening, said door having first and second vertical side members, said first door side member being hinged on the structure adjacent to said side of the door opening, said door being hollow and having outer and inner panels connected to said first and second side members, said outer panel and said second side member being formed with a horizontal opening, a bumper comprising an open-sided housing eccentrically pivoted on the door between the panels to pivot on a vertical axis, a compressible and resilient body secured in and reaching out of the housing, said bumper being adapted to occupy a retracted position within the door in the closed position of the door and to occupy an extended position while the door is in open position wherein the block extends laterally outwardly of the door through said opening, and operating means mounted within the door and connected to the bumper housing for retracting and extending the bumper, said operating means comprising a first horizontal rod having one end working through said first door side member for operative contact with the side of the door opening, a lever pivoted intermediate its ends on one of the door panels and connected at its lower end to said first rod, a second horizontal rod connected at one end to the upper end of the lever and at its other end to the bumper housing, a spring connected to and stretched between the upper part of the lever and the second side member of the door, said one panel being the outer door panel, and cushioning means operatively connected to the other end of said first rod.

References Cited by the Examiner
UNITED STATES PATENTS 2,226,615 12/1940 Killen.
2,678,232 5/1954 Barry.

BENJAMIN HERSH, *Primary Examiner.*

P. GOODMAN, *Assistant Examiner.*